(12) United States Patent
Gong (10) Patent No.: US 6,540,569 B1
(45) Date of Patent: Apr. 1, 2003

(54) INTEGRATED UTILITY PERSONAL VEHICLE

(76) Inventor: Shao-Wei Gong, 910 N. Willow Ave. M9E, Cookeville, TN (US) 38501

( * ) Notice: Subject to any disclaimer, the term of this patent is extended or adjusted under 35 U.S.C. 154(b) by 0 days.

(21) Appl. No.: 09/963,140

(22) Filed: Sep. 24, 2001

(51) Int. Cl.⁷ .................................................. B60F 3/00
(52) U.S. Cl. ............... 440/12.5; 440/12.51; 440/12.57; 440/12.59; 440/38; 440/42
(58) Field of Search ............................ 440/12.5, 12.51, 440/12.52, 12.53, 12.54, 12.62, 12.63, 12.65, 12.66, 12.67, 12.68, 12.69, 12.7, 38, 42, 12.57, 12.59, 12.6

(56) References Cited

U.S. PATENT DOCUMENTS

| | | | |
|---|---|---|---|
| 3,280,785 A | * 10/1966 | Mycroft | ....................... 114/344 |
| 3,359,937 A | * 12/1967 | D'Arena | ................... 440/12.51 |
| 3,659,546 A | * 5/1972 | Miklos | ........................ 114/246 |
| 3,965,843 A | 6/1976 | Smith | |
| 4,387,661 A | * 6/1983 | Duff | ........................ 114/145 R |
| 4,522,601 A | 6/1985 | Yoo | |
| 4,636,176 A | 1/1987 | Capilla | |
| 5,429,533 A | * 7/1995 | Kobayashi et al. | ........... 440/42 |
| 5,591,056 A | 1/1997 | Patino | |
| 5,682,832 A | 11/1997 | Millard | |
| 5,697,317 A | 12/1997 | Pereira | |
| 6,062,156 A | 5/2000 | Radke | |

FOREIGN PATENT DOCUMENTS

JP              185811     *  7/1990  ................ 440/12.5

* cited by examiner

Primary Examiner—Stephen Avila (57) ABSTRACT

A utility vehicle integrated a motorcycle and a motorized watercraft within a hull is presented. It can be set in a motorcycle status or a motorized watercraft status. The two statuses of the vehicle shares a driving power source, and a driving power shifting control system is used to shift the driving power to either one of the two statuses with rider's choice. A steering system also is used to control the move directions for both the motorcycle status and the motorized watercraft status. The hull of the vehicle is formed by a front hull with a front wheel cabinet and a rear hull with a rear wheel cabinet, and it is sealed to make the vehicle buoy on the water surfaces as a motorized watercraft. The wheels of the vehicle can be pushed out with the open of the wheel cabinet doors to stand as a conventional motorcycle, or can be pulled back and hide in the wheel cabinets with the close of the wheel cabinet doors. Therefore, the vehicle can be ridden as a typical conventional motorcycle on roads or as a typical conventional motorized watercraft on water surfaces

9 Claims, 11 Drawing Sheets

INTEGRATED UTILITY PERSONAL VEHICLE

BACKGROUND OF THE INVENTION

This invention is related to the personal transport vehicles that are typically used to ride people to their desired places by running both on land roads and on water surfaces. It also relates to the amusement apparatus of motorized watercrafts that are typically used to ride people on water surfaces for the amusements of water sports It is known that motorcycle is one of the important transport vehicles on the road. Because of its smaller volume and lighter weight, it is more fuel economic and space save than passenger cars. It is also much nimbler and less restriction of road condition than personal car; therefore, it is popular as the cross-country utility sports vehicle. Motorized watercraft is a recently popular transport apparatus on the water surfaces. With some similar characteristics of motorcycle, it has the name of the "water motorcycle". It is quite popular as one of the water amusement utility sports gears. Although the motorcycle and the motorized watercraft have something in common, they are two totally different transport equipments in different application categories. If a motorcycle can possess the capability of motorized watercraft running on water surfaces and if a motorized watercraft can possess the capability of motorcycle running on roads, it should be a useful and attractive development. It is noted that to design a boat driven by a land vehicle or a land vehicle can run on the water surfaces have been recognized for a long time. A number of inventions comprise the close known prior arts and embodiments, which have presented a variety of methods to use the power of land vehicles to propel boats, or adopt some technique of motorcycle in watercraft design:

U.S. Pat. No. 4,387,661;
U.S. Pat. No. 3,280,785;
U.S. Pat. No. 5,429,533;
U.S. Pat. No. 3,359,937;
U.S. Pat. No. 3,659,546;
JP Patent No. 185811;
U.S. Pat. No. 3,965,843;
U.S. Pat. No. 4,522,601;
U.S. Pat. No. 4,636,176;
U.S. Pat. No. 5,591,056;
U.S. Pat. No. 5,682,832;
U.S. Pat. No. 5,697,317;
U.S. Pat. No. 6,062,156.

U.S. Pat. No. 4,387,661 to Duff presented an amphibious motor-driven cycle that had an occupant-receiving hull, in which the front wheel well was defined by a special unit that provided watertight continuation of the hull and allowed the front wheel to turn for steering the vehicle on land. It used vanes mounted on the rear wheel to propel the vehicle through the water. The said invention did not provide a rational structure to retract and seal its wheels into a cabinet to reduce the dynamic resistant force of water when it runs on water. In fact, the use of vanes required the rear wheel to fully engage with water to generate propulsive force.

U.S. Pat. No. 3,280,785 to Mycroft presented an amphibious structure for a family automobile. The said structure included a wheel fairing structure for covering wheels. With the structure, it needed to twist the front torsion bar of the vehicle and to move the suspension of front wheel up and down. It also needed to retract the rear wheels by overcoming the spring force of suspension spring. To enclose the retracted wheels, it used both a motor-driven rotational parallel links and a motor-driven gear and rack to drive the outer fair members to cover the outer side of the rear wheel, and it needed a motor-driven gear and rack to drive the outer fair members to cover outer side of the front wheel. The said invention used a motor and gear transmission to rotate the inner fair members to cover inner side of the retracted wheels. When the vehicle was used as a boat, it did not necessarily provide an effective steering system and structure, and did not necessarily provide a workable propulsive system and structure. The structure of the said invention did not necessarily provide an effective and economic method. Moreover, the uneven and rough bulge of the structure to contain the retracted wheels had not necessarily provided a fair structure to reduce the dynamic resistant force of water when it runs on water.

U.S. Pat. No. 5,429,533 to Kobayashi et al. presented a small watercraft that had a single steering control to control two steering nozzles of jet propulsion units. The said invention did not form a closed loop of wire to control the steering nozzles. With the invention, when the wire used in the steering control was in compression the steering function of the invention might not necessarily work.

U.S. Pat. No. 3,359,937 to D'Arena presented an amphibious motor scooter that had a pair of flotation tanks which were hinged to the sides of the vehicle. The invention did not intend to provide a structure to reduce the dynamic resistant force of water, and it did not necessarily provide an effective steering system and propulsive system.

U.S. Pat. No. 3,659,546 to Miklos presented a motor-boat propelled pontoon boat that had a steering control which used a pilot wheel to operate a cable hooked on each side of the outboard motor. The invention was only for controlling a single propulsive unit of outboard motor, and it might not be necessarily used to control two propulsive units. Furthermore, since the steering force was generated by the friction between the steering shaft and the cable, if the resistant of the steering force was larger than the friction force, the cable might slide on the steering shaft and the steering control might not necessarily implement its steering function.

JP Patent No. 185811 to Sugimoto et al. presented an amphibious vehicle that had a left float and right float mounted on both left side and right side of the vehicle body respectively. The said invention did not intend to provide a structure to reduce the dynamic resistant force of water, and it did not necessarily provide an effective steering system when it is driven for water traveling.

U.S. Pat. No. 3,965,843 to Smith presented a device receiving motive power from a source which may be individuals, bicycles motorcycles automobiles, etc., and which was particularly used for transportation over water.

U.S. Pat. No. 4,522,601 to Yoo presented a boat to temporarily carry a vehicle, and said vehicle was arranged to drive a propeller shaft of the boat.

U.S. Pat. No. 4,636,176 to Capilla presented a boat propelled by a motorcycle, which had a portable ramp to get the motorcycle on and off.

U.S. Pat. No. 5,591,056 to Patino presented a motorcycle propelled boat, which was particularly designed to mount a motorcycle and to use a drive belt of special designed rear potion of boat that underneath the rear wheel of motorcycle to receive the driving power from said motorcycle.

U.S. Pat. No. 5,682,832 to Millard presented a floatation device for snowmobiles for the safety of emergency of breaking through the ice when traveling on a frozen body of water.

U.S. Pat. No. 5,697,317 to Pereira presented a hydro ski watercraft that had a motorcycle suspension. The said suspension made the watercraft safer to ride over rough and choppy water at a high speed.

U.S. Pat. No. 6,062,156 Radke, et al. presented a snowmobile powered watercraft that had a pair of forward pontoons mounted to the front suspension in place of conventional skis and a U-shaped rear pontoon mounted to the aft portion of the snowmobile body.

It is clear that these above inventions of U.S. Pat. Nos. 3,965,843, 4,522,601, 4,636,176, 5,591,056, 5,682,832, 5,697,317, and, 6,062,156 do not necessarily integrate the two different physical embodiments of motorcycle and motorized watercraft into one physical embodiment; thus, they must be separated to run on roads or on water surfaces. Furthermore, these said inventions do not necessarily intend to provide a structure to reduce the dynamic resistant force of water, and it does not necessary provide an effective steering system and propulsive system.

With the investigation, it shows that there are no such apparatuses in prior arts and existing product inventories, which have integrated the general advantages of the two different transport technologies of motorcycle and motorized watercraft. The aforesaid related inventions do not integrate the characteristics and functions of the two different transport technologies of motorcycle and motorized watercraft together into one vehicle.

The design methodologies of aforesaid related inventions are not to develop an integrated transport vehicle based on when it runs on water surfaces it is a typical conventional motorized watercraft. The design methodologies of aforesaid related inventions are not to develop an integrated transport vehicle based on when it runs on roads it is a typical conventional motorcycle. It is therefore an object of this invention to develop an apparatus to possess the integrated advantages of a motorcycle and a motorized watercraft, and at the same time, to keep the individual characteristics and working functions of the two transport vehicles when it is used differently on roads and on water surfaces as a motorcycle or a motorized watercraft.

BRIEF SUMMARY OF THE INVENTION

In this invention, a new personal transport vehicle is developed based on the integration of the technologies of motorcycle and motorized watercraft. It is characterized by providing some significant features of development with the adoptions and promotions of the advantages of both the motorcycle and the motorized watercraft. In general, the invention is to ride people to desired place over land roads or over water surfaces, and to provide people an amusement utility sports gear.

One of the features is to provide an apparatus that integrates a motorcycle and a motorized watercraft. The integrated structure can be shifted into a motorcycle status or a motorized watercraft status with the rider's choice to run as a motorcycle on roads, or to run as a motorized watercraft on water surfaces. When it runs, the motorcycle status and the motorized watercraft status are never interfered each another. When one of the two statuses is in working status, the other is disconnected.

One of the features is to provide a structure of hull that integrates the basic structure of a motorcycle and the basic structure of a motorized watercraft. The integrated structure can be shifted into a motorcycle status or a motorized watercraft status with the rider's choice.

Another feature is to provide a mechanical system that integrates the mechanical system of a motorcycle and the mechanical system of a motorized watercraft. The integrated mechanical system can be shifted into a motorcycle status or a motorized watercraft status with the rider's choice.

Still another feature is to provide at least one power source, such as, an internal combustion engine, to the apparatus as the driving power. The driving power from the power source can be shifted to drive the driving wheel in the motorcycle status or to drive the water jet propeller in the motorized watercraft status with the rider's choice.

The invention with its organization, working method, manner of operation, and utilization can be best understood by making reference to the following description of the drawings and the depictions of the invention.

BRIEF DESCRIPTION OF THE DRAWINGS

FIG. 2 is a front view of an embodiment of the invention.

FIG. 8 is the wheel suspension extension support of an embodiment of the invention.

DETAILED DESCRIPTION

Figures 1, 1A, 1B:
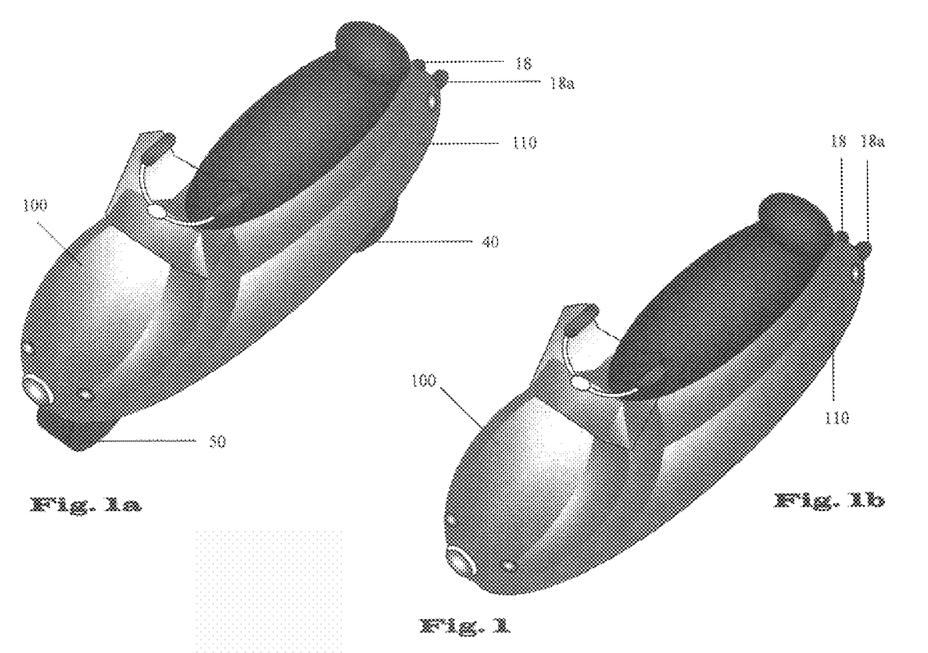
FIG. 1 is a bird view of an embodiment of the invention.
FIG. 1a is a bird view of an embodiment of the invention in the motorcycle status.
FIG. 1b is a bird view of an embodiment of the invention in the motorized watercraft status.
Figure 2A:
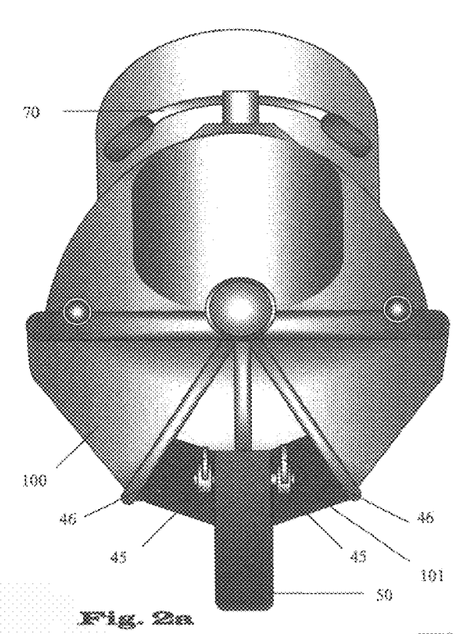
FIG. 2a is a front view of an embodiment of the invention in the motorcycle status.
Figure 2B:
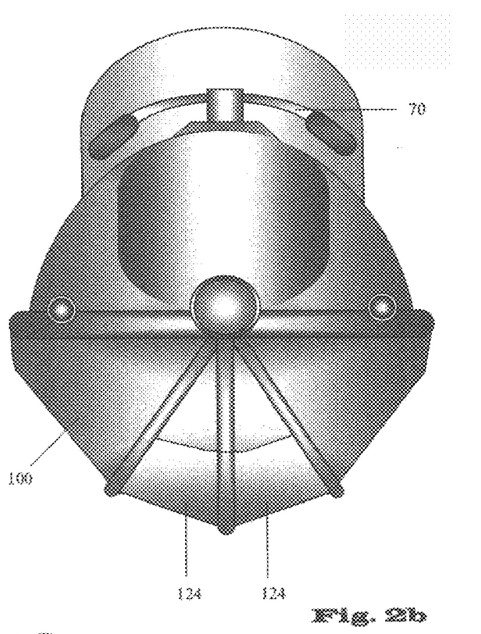
FIG. 2b is a front view of an embodiment of the invention in the motorized watercraft status.
Figure 3:
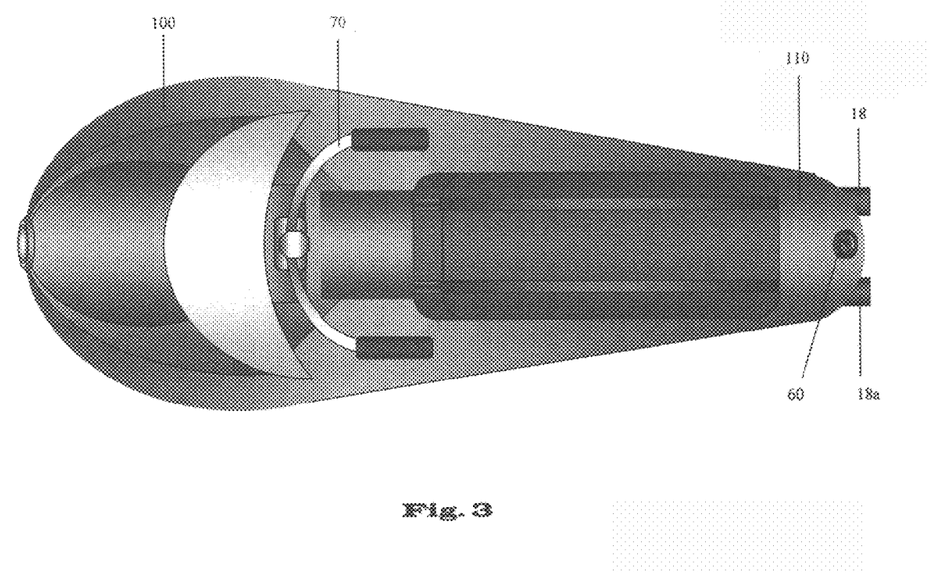
FIG. 3 is a top view of an embodiment of the invention.

The basics of the invention can be understood with reference from FIG. 1 to FIG. 3. FIG. 1 shows the bird view of an embodiment of the invention. FIG. 1a shows that the invention can be ridden as a conventional motorcycle. FIG.

1b shows that the invention can be driven as a conventional motorized watercraft. In the bird view of FIG. 1a and FIG. 1b, the front hull (100), the rear hull (110), the steering control nozzles (18) and (18a), the front wheel (50), and rear wheel (40) can be found. FIG. 2 is the front view of the embodiment of the invention. FIG. 2a shows the invention in the motorcycle status. In this status, the doors of the front and rear wheel cabinets are opened and the wheels are pushed out to the designated extending position. Since FIG. 2a is the front view, only the front hull (100), the front wheel (50) and front wheel cabinet (101) can be seen. In FIG. 2b, the invention is used as a motorized watercraft. In this status, the wheels are drawn back in the front and rear wheel cabinets (101) and (111), and the doors (124) and (124a) of the front and rear wheel cabinets are closed. Also, since FIG. 2b is the front view and front door (124) is closed, here, the front and rear wheel cabinets (101) and (111), and the door (124a) of rear wheel cabinet cannot be seen.

FIG. 3 is the top view of the embodiment of the invention. In FIG. 3, the front hull (100) and the rear hull (110) form the hull of the invention. The top view of the embodiment of the invention is the same when it is in the motorcycle status or in the motorized watercraft status.

Figure 4:
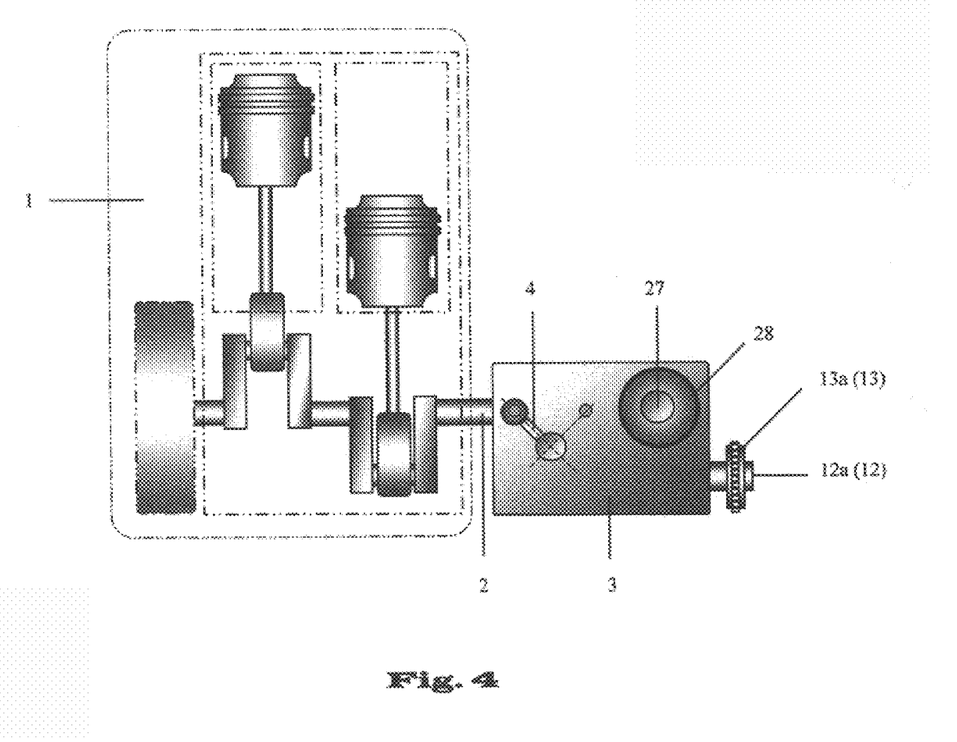
FIG. 4 is the side view of the power source of engine and the driving power shifting control system of an embodiment of the invention.

FIG. 4 shows that the driving power from the power source (1) transfers through the output shaft (2) to the driving power shifting control system (3) with the said embodiment of the invention. Here, at least an internal combustion engine (1) is used as the power source. The driving power is controlled by the shifting folk (4) to the motorcycle status through shaft (27) to turn the chain gear (28), or to. the motorized watercraft status through shafts (12 and 12a) to turn the chain gears (13 and 13a). In this view, Shaft (12) and Chain gear (13) are hiding behind Shaft (12a) and Chain gear (13a).

Figure 5:
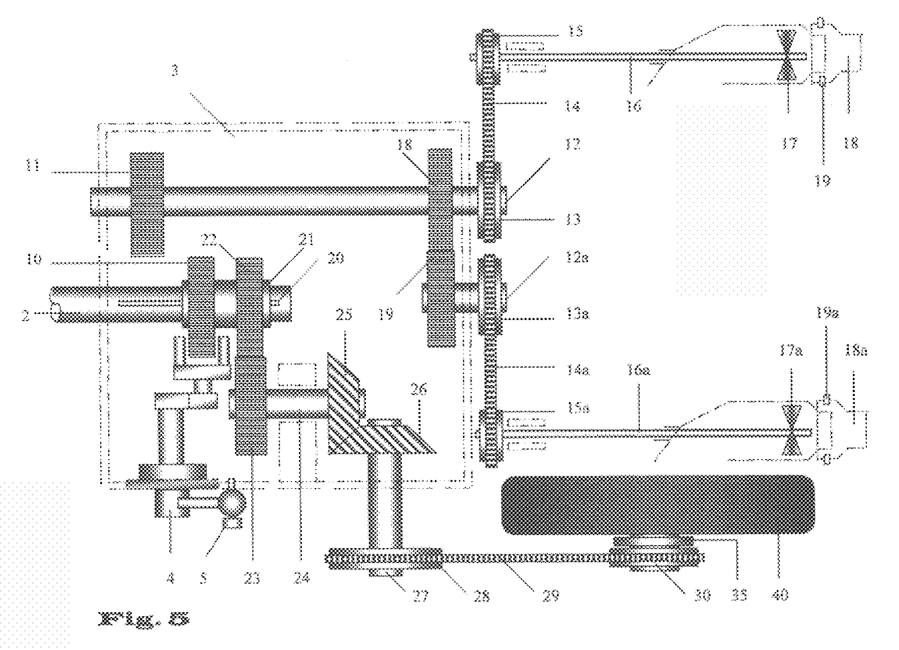
FIG. 5 is the mechanism diagram of the driving power shifting control system of an embodiment of the invention in the motorized watercraft status.

FIG. 5 is the mechanism diagram that demonstrates how the driving power shifting control system works with the embodiment of the invention. In FIG. 5, the invention is in motorcycle status. The driving power generated by the internal combustion engine (1) with the embodiment flows through the connecting shaft (2) to the power shifting control system (3). In the power shifting control system, the shifting control folk (4) push the gear (10) with sliding tube (21) along the guiding way of key pin (20) to put the gear (22) to contact with gear (23), and then to turn the shaft (24) to rotate the bevel gear pair (25) and (26). Then, the bevel gear (26) will turn the shaft (27) to rotate the chain gear (28). Finally, the chain gear (28) drives the driving wheel (40) to run through the chain rope (29) and the chain gear (30). Please note that the lock pin (5) will lock the shifting control system in the motorcycle status to keep the system stable.

Figure 6:
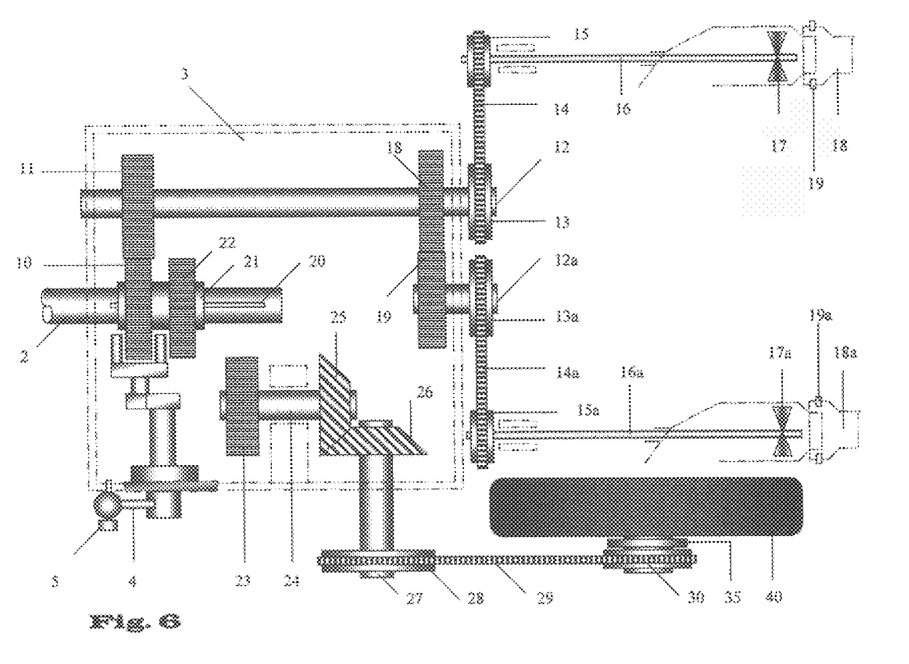
FIG. 6 is the mechanism diagram of an embodiment of the driving power shifting control system of an embodiment of the invention in the motorcycle status.

FIG. 6 shows an embodiment of the invention in the motorized watercraft status. The mechanism diagram of FIG. 6 demonstrates how the driving power is shifted to driving the water jet propellers (17) and (17a) to propel the invention as a motorized watercraft on water surfaces. The driving power generated by the internal combustion engine (1) flows through the connecting shaft (2) to the power shifting control system (3). In the power shifting control system, the shifting control folk (4) push the gear (10) to contact gear (11), and then to rotate chain gear (13) by shaft (12). The chain gear (13) will then to drive the jet propeller (17) through chain rope (14), chain gear (15) and shaft (16). In the invention, at least one propeller has to be used. In the said particular embodiment of the invention two symmetric propellers are used. The driving power through the shaft (12) will goes into two branches. One branch goes to chain gear (13), and the other branch goes through the gear pair (18) and (19) to rotate the chain gear (13a). The chain gear (13a) will then to drive the jet propeller (17a) through chain rope (14a), chain gear (15a) and shaft (16a). In FIG. 6, the projection of the water intake nozzle in the drawing has been turned 90 degrees for the best demonstration of the water jet propeller. Please note that Parts (18) and (18a) are the steering nozzle, and Parts (19) and (19a) are the corresponding pivots. Also, the lock pin (5) will lock the shifting control system in the motorized watercraft status to keep the system stable.

Figure 7:
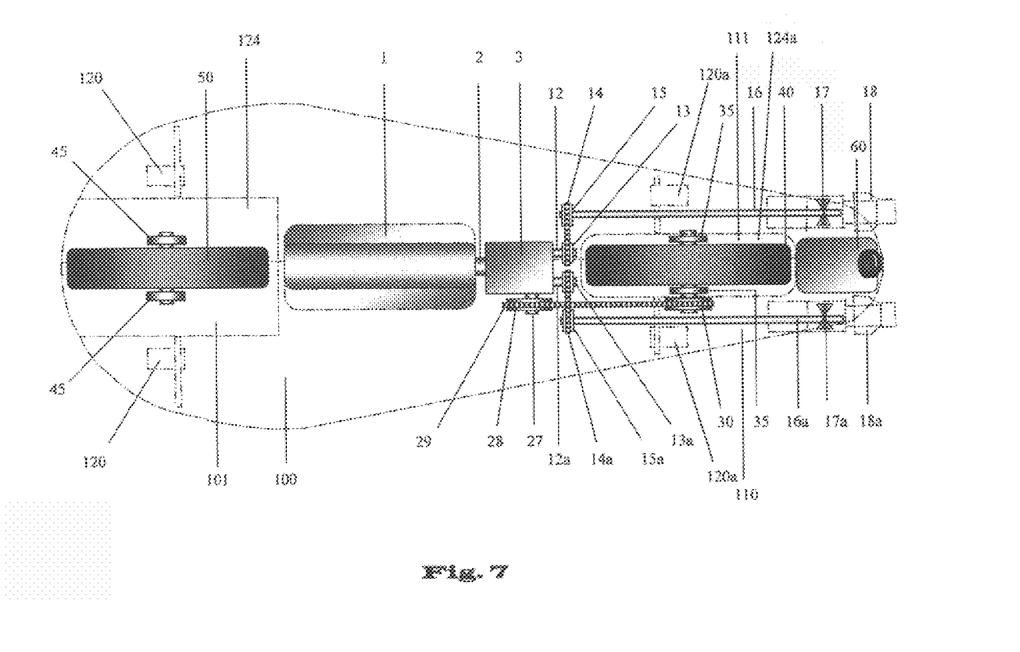
FIG. 7 is the top view of the mechanical system of an embodiment of the invention.

FIG. 7 depicts the basics of the mechanical system and arrangement of the embodiment of the invention. Here, Part (45) is the front wheel suspension connecting support that holds the front wheel (50) with the front suspension fork. Part (35) is the rear wheel suspension connecting support that holds the rear wheel (40) with the rear suspension fork. Pointed objects (100) and (101) are the front hull and the front wheel cabinet. Pointed object (110) and (111) are the rear hull and the rear wheel cabinet. Object (120) is the front wheel cabinet gate system of the embodiment of the invention, and object (120a) is the rear wheel cabinet gate system. Part (60) is the fuel tank.

From FIG. 7, one can see that the driving power generated by the engine (1) first pours into the power shifting control system (3) through connecting shaft (2). The system (3) can shift the driving power either to the motorcycle status or to the motorized watercraft status with each one at a time; therefore, the power will be shifted to go with one of the two ways of system (3) following rider's choice.

If the rider chooses to ride the invention as a motorcycle, after the shift control folk is arranged at the predetermined motorcycle position, the driving power will go out of the power shifting system (3) through shaft (27), and then the power will turn the chain gear (28) to rotate the driving wheel (40) with chain rope (29) and chain gear (30).

If the rider choose the way to ride the invention as a motorized watercraft, after the shift control folk is arranged at the predetermined motorized watercraft position, the driving power will go out of the power shifting system (3) through shafts (12) and (12a) to two channels to run the two water Jet propellers. One channel of the power will turn the chain gear (13) to rotate the water jet propeller (18) with chain rope (14), chain gear (15) and shaft (16). The other channel of the power will turn the chain gear (13a) to rotate the water jet propeller (18a) with chain rope (14a), chain gear (15a) and shaft (16a). Here, the parts (18) and (18a) are the steering nozzles of the embodiment of the invention.

FIG. 8 depicts the wheels of the embodiment of the invention in both the motorcycle and the motorized watercraft statuses.

Figure 8A:
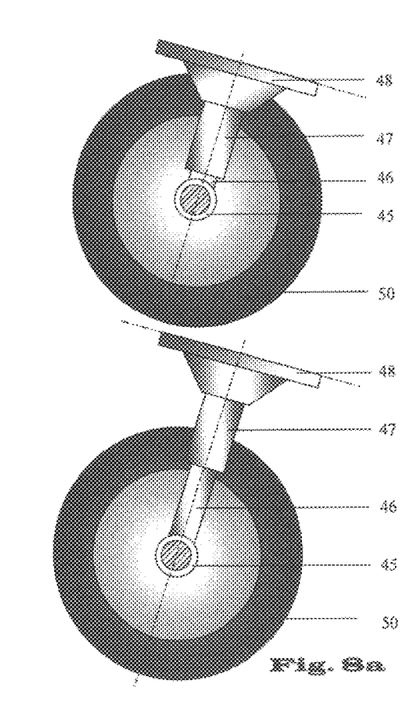
FIG. 8a is the front wheel suspension extension support of an embodiment of the invention in both the motorcycle status and the motorized watercraft status.

FIG. 8a shows the front wheel in both the motorcycle and the motorized watercraft statuses. The top drawing describes the front wheel in motorized watercraft status. In this status, the front wheel suspension extension support system pulls up the front wheel and holds it in the front wheel cabinet. The bottom drawing describes the front wheel in motorcycle status. In this status, the front wheel suspension extension support system pushes down the wheel out of the cabinet and holds it at the designated position to work as a motorcycle front wheel.

Figure 8B:
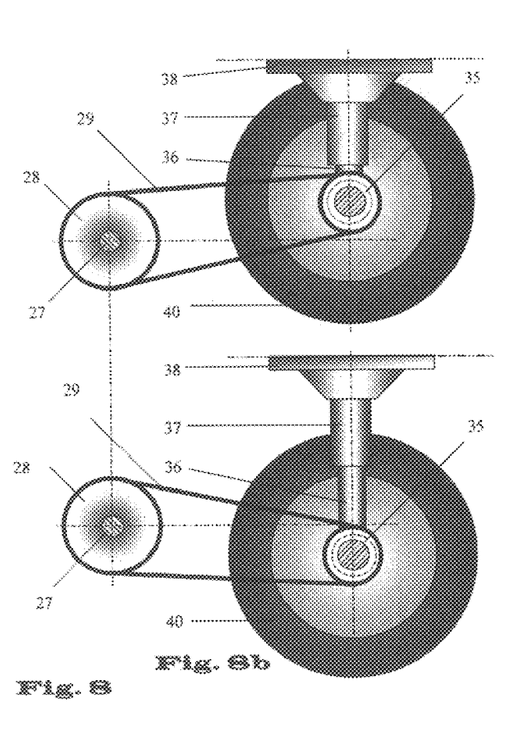
FIG. 8b is the rear wheel suspension extension support of an embodiment of the invention in both the motorcycle status and the motorized watercraft status.

FIG. 8b shows the rear wheel in both the motorcycle and the motorized watercraft statuses. The top drawing describes the front wheel in motorized watercraft status. In this status, the rear wheel suspension extension support system pulls up the real wheel and holds it in the rear wheel cabinet. The bottom drawing describes the rear wheel in motorcycle status. In this status, the front wheel suspension extension support system pushes down the wheel out of the cabinet and holds it at the designated position to work as a motorcycle rear wheel.

Figures 9, 9A, 9B:
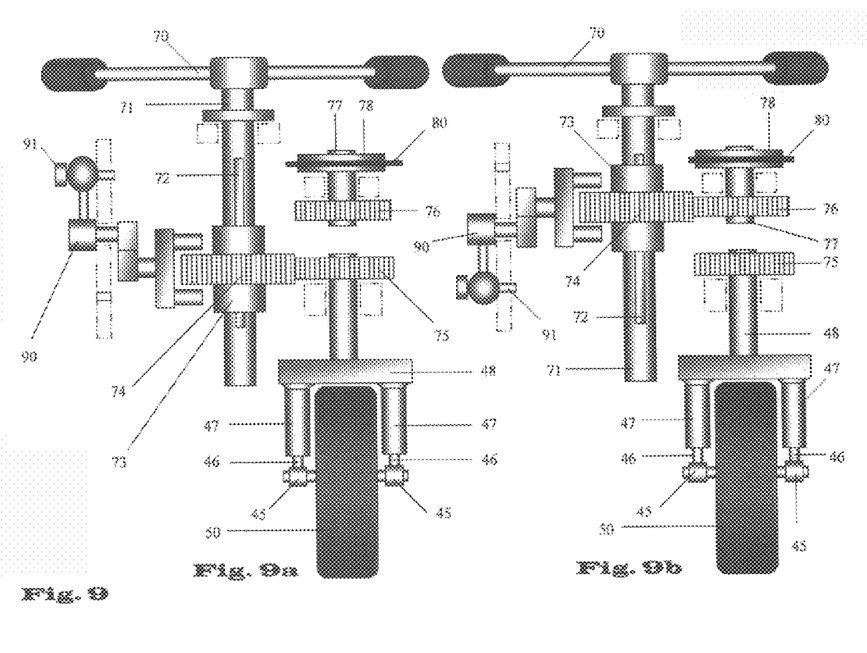
FIG. 9 is the steering control system of an embodiment of the invention.
FIG. 9a is the steering control of an embodiment of the invention in the motorcycle status.
FIG. 9b is the steering control of an embodiment of the invention in the motorized watercraft status.

FIG. 9 demonstrates an embodiment of the steering system of the invention. The front wheel is arranged as the steering wheel. A steering shifting control system is used to transfer the steering motion generated by the rider with the handle bar to the motorcycle steering wheel or to the watercraft steering nozzle.

FIG. 9a shows the invention in the motorcycle status. Once the control folk (90) move the connecting gear (74) with the sliding tube (73) following the guiding way of key (72) to contact with gear (75), the steering rotation generated by the rider at the steering handle bar (70) can pass through the shaft (71), sliding tube (73), and connecting gear (74) to gear (75) to turn the front wheel support fork (48). Thereby, the front wheel (50) steering can be achieved. Here, the lock pin (91) will lock the steering control system in motorcycle status to keep the system stable.

FIG. 9b shows the invention in the motorized watercraft status. Once the control folk (90) move the connecting gear (74) with the sliding tube (73) following the guiding way of key (72) to contact with gear (76), the steering rotation generated by the rider at the steering handle bar (70) can pass through the shaft (71), sliding tube (73), and connecting gear (74) to gear (76) to turn the controlling wheel of water jet steering nozzle (78) with the shaft (77). In this way, the water jet steering nozzles (18) and (18a) can be rotated by rope (80) to achieve the steering capability of the motorized watercraft. Also, the lock pin (91) will lock the steering control system in motorized watercraft status to keep the system stable.

Figure 10:
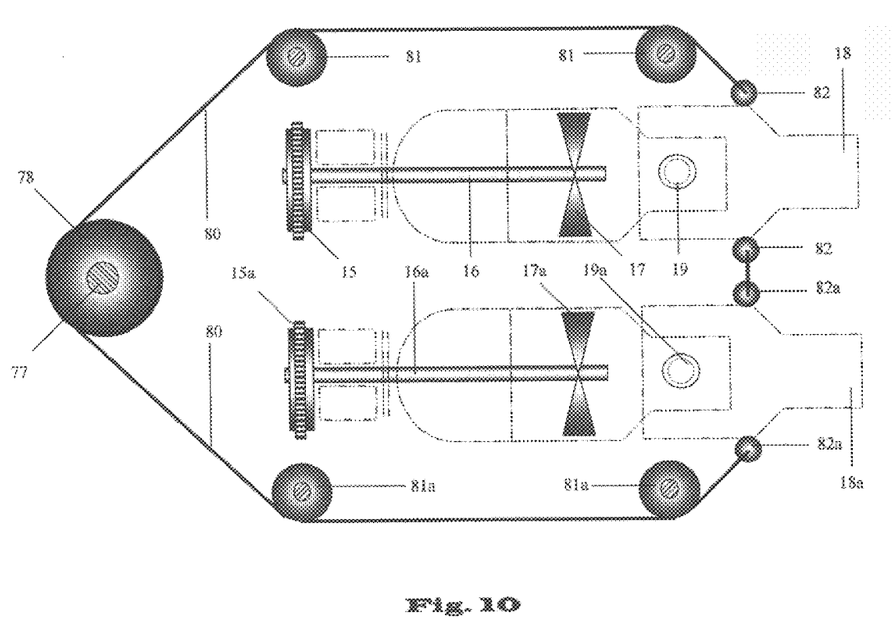
FIG. 10 is the mechanism diagram of the steering system in the motorized watercraft status of an embodiment of the invention.

FIG. 10 is the mechanism diagram of the invention in the motorized watercraft status. The motion generated by the rider goes through shaft (77) and control wheel (78) to turn the rope around control wheel (78) to pull the steering nozzles (18) and (18a) to rotates around pivots (19) and (19a) respectively. In this embodiment of the steering system, the rope (78) will connect the nozzles (18) and (18a) to form a close loop; thus, the rotation of the steering control wheel will turn to the rotation of the steering nozzles.

Figure 11:
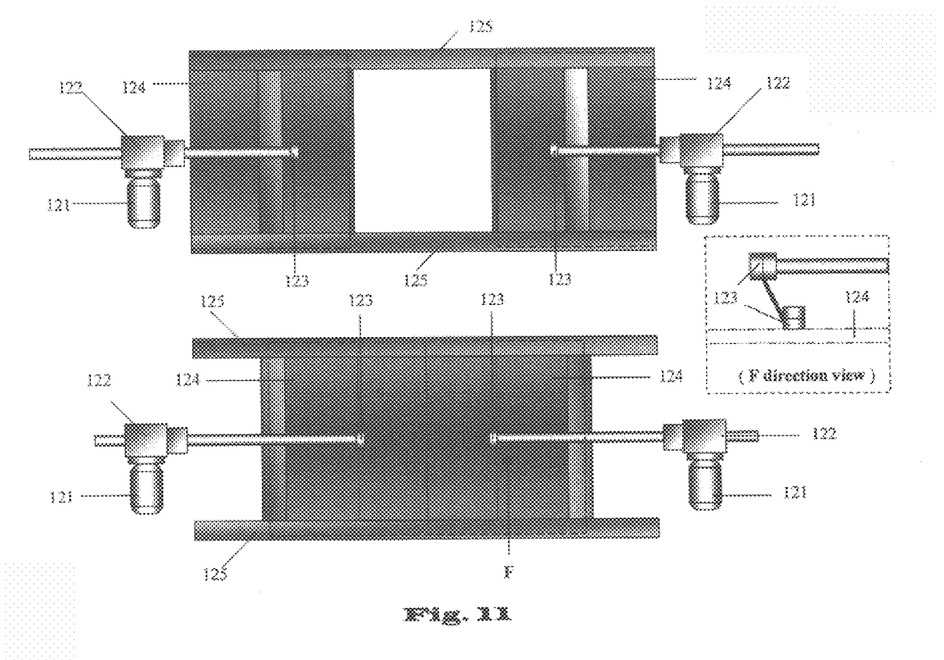
FIG. 11 is the mechanism diagram of the front and rear wheel cabinet gates of an embodiment of the invention.

FIG. 11 is the mechanism diagram of the wheel cabinet gate system (120). When the invention is in the motorcycle status, the doors of the front wheel cabinet and rear wheel cabinet must be opened to let the wheel suspension extension supports push out the front and rear wheel out. Therefore, the wheels can stand as the conventional wheels of a motorcycle. When the invention is in the motorized watercraft status, the doors of the front wheel cabinet and rear wheel cabinet must let the wheels suspension extension supports pull back the front and rear wheels in the cabinets, and then the doors must be closed to reduce the water resistance as large as possible. Therefore, the invention can work well on the water surface just as a typical conventional motorized watercraft.

Since the basic structure and mechanisms of the front and rear gates are the same, here, only the front door of the wheel cabinet is shown. In FIG. 11, an electric motor (121) will turn the linear head (122) to open or close the door body (124) through the connection (123). The top drawing in FIG. 11 shows the door in open, and the bottom drawing shows the door in close. Here, pointed object (125) is the guiding slot of the door body. The view of FIG. 11 is from inside to outside. View F shows the connection (123). For the consideration of the mobility of the door body, an elastic rope is used here to increase the degree of the freedom of the connection to achieve the smooth movement of the door. In the rear door, for better understanding, the part corresponding to the front door is marked the same number followed with an extra a. For example, the electric Having presented my invention, I claim:

1. An integrated utility personal vehicle integrating a motorcycle and a motorized watercraft comprises a hull consisting of a sealed front hull with a front wheel cabinet that possesses a front door with a front door control connection having an elastic rope and a sealed rear hull with a rear wheel cabinet that possesses a rear door with a rear door control connection having an elastic rope;

at least a front steering wheel;

at least a rear driving wheel;

at least a water jet propeller;

at least an internal combustion engine mounted within said hull;

a driving power shifting control system;

a steering system that consists of a steering wheel, a rope, and at least a steering nozzle;

a braking system;

a front wheel extending suspension support system mounted in the front cabinet;

a rear wheel extending suspension support system mounted in the rear cabinet;

wherein the said front hull is wider than the said rear hull; whereby, it makes the said hull form a streamline shape to reduce the dynamic resistant force of water and to provide enough floating force with avoidance of too long and too awkward appearance when the said integrated utility personal vehicle is in the motorized watercraft status, and also to let the rider easily ride across the seat mounted on the rear hull to stand on her/his feet on road when the said integrated utility personal vehicle is in the motorcycle status;

whereby, the said vehicle can be set in a motorcycle status to run as a motorcycle on roads or in a motorized watercraft status to run as a motorized watercraft on water surfaces.

2. The integrated utility personal vehicle according to claim 1 wherein the said front hull can be narrower than the said rear hull; whereby, it makes the said hull form a reversed streamline shape to reduce the dynamic resistant force of water and to provide enough floating force with avoidance of too long and too awkward appearance when the said integrated utility personal vehicle is in the motorized watercraft status, and also to let the rider easily ride across the seat mounted on the front hull to stand on her/his feet on road when the said integrated utility personal vehicle is in the motorcycle status.

3. The integrated utility personal vehicle according to claim 1 wherein the said rope in the said steering system is rounded and fixed on the shaft of the said steering wheel with connection to the said steering nozzle to form a closed loop to turn the steering nozzle, in which said rounded manner of the said rope means that the rope is with at least one round on the said shaft of steering wheel and said fixed manner of the said rope means that the rope is fixed at proper position on the said shaft of the steering wheel.

4. The integrated utility personal vehicle according to claim 1 wherein said front door can be opened to let the said front wheel extending suspension support system push the said front wheel out of the said front wheel cabinet and then stand to run as a front wheel of a motorcycle when the said integrated utility personal vehicle is in the motorcycle status.

5. The integrated utility personal vehicle according to claim 1 wherein said rear door can be opened to let the said rear wheel extending suspension support system push the said rear wheel out of the said rear wheel cabinet and then stand to run as a rear wheel of a motorcycle when the said integrated utility personal vehicle is in the motorcycle status.

6. The integrated utility personal vehicle according to claim 1 wherein said front door can be closed after the said front wheel extending suspension support system pulled the said front wheel back in the said front wheel cabinet to make the said integrated utility personal vehicle to run smoothly on water surfaces when the said integrated utility personal vehicle is in the motorized watercraft status.

7. The integrated utility personal vehicle according to claim 1 wherein said rear door can be closed after the said rear wheel extending suspension support system pulled the said rear wheel back in the said rear wheel cabinet to make the said integrated utility personal vehicle to run smoothly on water surfaces when the said integrated utility personal vehicle is in the motorized watercraft status.

8. The integrated utility personal vehicle according to claim 1 within said front door control connection uses an elastic rope to achieve the proper degree of freedom to open and to close the front door.

9. The integrated utility personal vehicle according to claim 1 within said rear door control connection uses an elastic rope to achieve the proper degree of freedom to open and to close the rear door.

* * * * *